United States Patent
Su

(10) Patent No.: US 11,014,081 B2
(45) Date of Patent: May 25, 2021

(54) CATALYTIC PHASE CHANGE DIELECTRIC SPHERE FOR METHANOL COMBUSTION AND PREPARATION METHOD THEREFOR

(71) Applicant: Bin Su, Beijing (CN)

(72) Inventor: Bin Su, Beijing (CN)

( * ) Notice: Subject to any disclaimer, the term of this patent is extended or adjusted under 35 U.S.C. 154(b) by 90 days.

(21) Appl. No.: 16/663,390

(22) Filed: Oct. 25, 2019

(65) Prior Publication Data

US 2020/0055038 A1 Feb. 20, 2020

Related U.S. Application Data

(63) Continuation of application No. PCT/CN2019/108102, filed on Sep. 26, 2019.

(30) Foreign Application Priority Data

Feb. 25, 2019 (CN) .......................... 201910138776.2

(51) Int. Cl.

| | |
|---|---|
| *B01J 35/08* | (2006.01) |
| *B01J 37/04* | (2006.01) |
| *B01J 37/00* | (2006.01) |
| *B01J 37/08* | (2006.01) |
| *B01J 21/16* | (2006.01) |
| *B01J 23/44* | (2006.01) |
| *B01J 21/04* | (2006.01) |
| *B01J 21/06* | (2006.01) |
| *B01J 23/04* | (2006.01) |

(52) U.S. Cl.
CPC ............... *B01J 35/08* (2013.01); *B01J 21/04* (2013.01); *B01J 21/063* (2013.01); *B01J 21/16* (2013.01); *B01J 23/04* (2013.01); *B01J 23/44* (2013.01); *B01J 37/0063* (2013.01); *B01J 37/04* (2013.01); *B01J 37/08* (2013.01)

(58) Field of Classification Search
CPC . B01J 21/04; B01J 21/063; B01J 21/16; B01J 23/04; B01J 23/44; B01J 23/63; B01J 23/8993; B01J 35/0033; B01J 35/08; B01J 37/0063; B01J 37/04; B01J 37/08
See application file for complete search history.

(56) References Cited

FOREIGN PATENT DOCUMENTS

WO WO 2018232133 * 12/2018 .............. B01J 23/02

* cited by examiner

*Primary Examiner* — Brian A McCaig
(74) *Attorney, Agent, or Firm* — HYIP

(57) ABSTRACT

The present invention discloses a catalytic phase change dielectric sphere for methanol combustion and a preparation method therefor. The catalytic phase change dielectric sphere for methanol combustion is mainly prepared from a high-temperature phase change material, an active material, a carrier material, a catalyst, a nano-semiconductor material, a nano-transition metal and an adhesive. A catalytic phase change dielectric solid sphere is prepared with a mixed pressing and sintering process, the methanol energy conversion rate reaches 87.5%, the furnace temperature of methanol combustion reaches 900° C. or higher, and waste heat recovery is realized; or, a catalytic phase change dielectric microporous hollow sphere is prepared through electrostatic adsorption and in-site redox reaction, the methanol energy conversion rate reaches 99% or higher, the furnace temperature of methanol combustion reaches 1000° C. or higher, and waste heat recovery is realized.

10 Claims, No Drawings

CATALYTIC PHASE CHANGE DIELECTRIC SPHERE FOR METHANOL COMBUSTION AND PREPARATION METHOD THEREFOR

TECHNICAL FIELD

The present invention relates to the field of catalysts, relates to a catalyst for methanol combustion and a preparation method therefor, and particularly relates to a catalytic phase change dielectric sphere for methanol combustion and a preparation method therefor.

BACKGROUND

Energy has an extremely important strategic position in the national economy. Due to the advantages of large total volume, wide distribution range and the like, solar energy, wind energy and industrial waste heat are widely used in recent years, however, due to the characteristics of discontinuity and instability, the efficient use of these energy is limited. Thermal storage technology is a key technology to solve these problems. Methanol has the characteristics of high boiling point and low octane number, which makes it have the characteristics of high oxygen content and weaker calorific value than gasoline when used as a fuel, and have the latent heat of vaporization more than three times that of gasoline.

Meanwhile, because the physical and chemical properties of methanol fuel are close to gasoline, methanol is ignited only when the concentration of methanol in the air must be 4 times that of gasoline, the burning rate is 4 times lower than that of gasoline, and the released heat is only ⅛ of that of gasoline. Moreover, the methanol flame can be extinguished with water alone. The special multiple redox reaction technology of methanol is used to generate the transition substance hydrogen in process, which promotes the complex chemical reaction of methanol at high temperature. There are many transition substances during reaction. To promote the large-scale methanol catalytic combustion technology, the key is to develop a special high-efficiency large-scale methanol catalytic combustion agent, which is still a new research and development field at home and abroad, is at the start stage, and there are no similar patents and papers and literature reports.

SUMMARY

In view of this, the present invention provides a catalytic phase change dielectric sphere for methanol combustion and a preparation method therefor. The catalytic phase change dielectric sphere for methanol combustion uses a high-temperature phase change material as a heat accumulator, so that energy can be stably output, the methanol conversion rate can be increased, and the combustion temperature of the furnace can be increased. The final products are still $H_2O$ and $CO_2$, which have no clear flame during reaction, have no flame or explosion problem, and have high safety performance.

To achieve the above purpose, the present invention adopts the following technical solution:

A catalytic phase change dielectric sphere for methanol combustion, prepared from the following part by weight of raw materials (measured by 100 parts by weight): 8-12 parts of high-temperature phase change material, 0.05-0.30 part of active material, 75.2-81.7 parts of carrier material, 0.10-0.20 part of catalyst material, 0.10-0.20 part of nano-semiconductor material, 0.05-0.10 part of nano-transition metal and 10-12 parts of adhesive.

The catalytic phase change dielectric sphere for methanol combustion of the present invention uses a high-temperature phase change material as a heat accumulator, so that energy can be stably output, the methanol conversion rate can be increased, and the combustion temperature of the furnace can be increased. The final products are still $H_2O$ and $CO_2$, which have no clear flame during reaction, have no flame or explosion problem, and have high safety performance; and the nano-semiconductor material and nano-transition metal of the raw materials can effectively increase methanol combustion temperature and combustion efficiency.

Further, the high-temperature phase change material is a binary-molten-salt high-temperature phase change material consisting of sodium carbonate and sodium chloride (the mass ratio is 0.5-1:0.75-1, preferably, 1:1) with the melting point of 646° C., specific heat of 1.56 J/(g. ° C.), and latent heat of 150 J/g; is binary-molten-salt high-temperature phase change material consisting of sodium carbonate and potassium carbonate (the mass ratio is 0.5-1:0.75-1, preferably, 1:1) with the melting point of 710° C., specific heat 1.68 J/(g. ° C.), and latent heat of 294 J/g; a ternary-molten-salt high-temperature phase, change material consisting of sodium carbonate, potassium chloride and sodium chloride (the mass ratio is 0.5-1:0.75-1:0.75-1, preferably, 1:1:1) with the melting point of 567° C., specific heat of 1.79 J/(g. ° C.), and latent heat of 134.69 J/g; or is a high-temperature phase change material consisting of sodium carbonate, potassium carbonate, lithium carbonate and magnesium oxide (the mass ratio is 0.5-1:0.5-1:1:0.3-0.65, preferably, 1:1:1:0.65) with the melting point of 686° C., specific heat of 1.81 J/(g. ° C.), and latent heat of 199 J/g.

The active material is one or a combination of platinum, palladium, rhodium or iridium;
  the carrier material is one or a combination of a-Al2O3, kyanite, spinel, silicon carbide, silicon nitride, silicon phosphide, boron carbide, boron nitride, boron phosphide, mullite;
  the catalyst material is one or a combination of magnesium oxide, cerium dioxide, copper oxide, manganese oxide;
  the nano-semiconductor material is one or a combination of nano titanium dioxide, nano zinc oxide, nano tin oxide, nano cadmium oxide, nano ferric oxide, nano aluminium oxide, nano chromium oxide and nano aluminium trioxide;
  the nano-transition metal is one or a combination of nano cerium oxide, nano cobaltous oxide and nano tungsten oxide; and
  the adhesive is one or a combination of silica sol, potassium silicate, sodium silicate, silicone resin, phenolic resin, urea-formaldehyde resin, high-temperature-resistant epoxy resin and polyimide resin.

The present invention selects a nano-semiconductor material and a nano-transition metal which have good thermal conductivity, high thermal stability and high catalytic activity as specific raw materials, so that for the catalytic phase change dielectric sphere for methanol combustion, when catalyzing methanol combustion, the methanol combustion is more sufficient, the combustion area is larger, and the flame dispersion is more uniform.

The above-mentioned materials are ultra-fine micron materials, preferably, nano materials.

The present invention further provides a preparation method for the catalytic phase change dielectric sphere for methanol combustion, comprising a solution 1 and a solution 2, wherein the solution 1 comprises the following steps:
1) weighing each raw material according to the part by weight of the raw materials of the catalytic phase change dielectric sphere for methanol;
2) uniformly mixing the active material, the carrier material, the catalyst material, the nano-semiconductor material and the nano-transition metal, grinding the mixture to be ultra-fine micron powder, adding to the high-temperature phase change material, dispersing for 30-35 min at the rotational speed of 3500-5000 r/min, preferably 30 min, to be uniform, and obtaining a premix material;
3) adding adhesive and an appropriate amount of water to the premix material, fully stirring, dispersing and mixing, granulating, wherein the granulating diameter is 6-19 mm, and the granulating pressure is 13-17 mpa, preferably 15 mpa, and obtaining an initial product of the dielectric sphere, wherein the adding amount of water accounts for 0.5%-0.8% of the gross weight of the raw materials of the catalytic phase change dielectric sphere for methanol combustion; and
4) firing the initial product of the dielectric sphere for 1-1.5 h at 730-750° C., preferably, firing for 1 h at 750° C., molding, and obtaining a solid sphere of the catalytic phase change dielectric sphere for methanol combustion; and the solution 2 comprises the following steps:
1) weighing each raw material according to the part by weight of the raw materials of the catalytic phase change dielectric sphere for methanol;
2) dividing the carrier material into two parts, preparing the first part of carrier material into a hollow sphere, adhering the high-temperature phase change material to the surface of the hollow sphere by adhesive, wherein the adhering mode is that: the carrier material and the high-temperature phase change material which are coated or sprayed with adhesive are stirred and mixed in a roller pan mixer or a drum mixer, so that the high-temperature phase change material uniformly wraps the carrier material, wherein the wrapping thickness of the high-temperature phase change material is 18-20 um, preferably 20 um, drying for 30-32 min at 80-85° C., preferably drying for 30 min at 80° C., wherein the mass ratio, of the first part of carrier material to the second part of carrier material is 0.5-1:1;
3) mixing with the active material, the second part of carrier material, the catalyst, the nano-semiconductor material and the nano-transition metal, conducting in-site redox reaction on the core shell structure for 15-30 min, and obtaining a double-shell structure, i.e. a structure similar to egg yolk-egg shell; and
4) firing the double-shell structure for 1-1.5 h at 730-750° C., preferably, firing for 1 h at 750° C., and obtaining a hollow microporous sphere of the catalytic phase change dielectric sphere for methanol combustion.

The step of preparing the hollow microporous sphere of the catalytic phase change dielectric sphere for methanol combustion may include the following steps: weighing the raw materials, mixing the suspended a-$Al_2O_3$ hollow sphere with adhesive first by a fluidized bed mixing device with the temperature of 80° C., then mixing same with a suspended high-temperature phase change material, the whole process duration being 5 min, conducting in-situ redox reaction on the core shell structure of the active material, the carrier material, the catalyst material, the nano-semiconductor material and the nano-transition metal to obtain an egg yolk-egg shell structure, firing for 1 h at the calcination temperature of 750° C. in the air finally, and obtaining the hollow microporous sphere of the catalytic phase change dielectric sphere for methanol combustion.

For the catalytic phase change dielectric sphere for methanol combustion of the present invention, dielectric spheres of different shapes can be obtained according to different preparation methods, specifically solid spheres of the catalytic phase change dielectric sphere for methanol combustion and hollow microporous spheres of the catalytic phase change dielectric sphere for methanol combustion,
wherein by means of the solid sphere of the catalytic phase change dielectric sphere for methanol combustion, the methanol energy conversion rate can reach 87.5%, the furnace temperature of methanol combustion can reach 900° C. or higher, and waste heat recovery is realized; and
by means of the hollow microporous sphere of the catalytic phase change dielectric sphere for methanol combustion, the methanol energy conversion rate can reach 99% or higher, the furnace temperature of methanol combustion can reach 1000° C. or higher, and waste heat recovery is realized, the hollow microporous sphere has the structure advantages and characteristics that:

1. Compared with other materials identical to same in component but different in structure, the hollow microporous sphere of the catalytic phase change dielectric sphere for methanol combustion has a hollow structure, and thus has a larger specific surface area, for a catalyst, the larger the specific surface area, the more the catalytic active sites, therefore, increasing the specific surface area is one of the best methods to increase the catalytic activity of the catalyst.

2 The hollow sphere prepared from the carrier material is a hierarchical porous structure material, and acts as a catalytic microreactor to bind mutually incompatible components with catalytic active functions into internal voids, in this way, not only the problem of sintering agglomeration of active species such as noble metals, etc. in the catalytic process can be effectively solved, but also the mutually incompatible components with catalytic active functions can be unified in the same structure.

3. The shell of the hollow microporous sphere of the catalytic phase change dielectric sphere for methanol combustion is assembled from nano particles. Thus, the aperture of the shell can be controlled by controlling the particle size and shell thickness by adjusting the usage amount and technology in the preparation process, the hierarchical porous structure of the hollow microporous sphere of the catalytic phase change dielectric sphere for methanol combustion can increase the transmission rate of reactant significantly, so that, the reactant come into sufficient contact with the catalytic active center, thereby increasing the catalytic activity thereof.

4. The size of the components forming the shell is usually only a few nanometers, the smaller the size, the more the surface defects of the nano particles, and the lower the coordination number of active species, which is also a major reason why the hollow sphere has good catalytic activity.

5. Made from a high-temperature phase change material, the inner shell undergoes phase change at a specific temperature (such as phase change temperature), accompanied by absorption or release of heat, and can be used for controlling the temperature of the ambient environment or used for storing heat energy. The inner shell stores heat, and releases heat if needed, thereby increasing the utilization rate of energy. The methanol energy conversion rate can reach 99% or higher, the furnace temperature of methanol combustion can reach 1000° C. or higher, and waste heat recovery is, realized.

Further, the high-temperature phase change material is prepared by the following steps:
1) uniformly mixing the raw materials of the high-temperature phase change material according to mass ratio, drying for 24-30 h at 115-125° C., preferably, drying for 24 h at 120° C., grinding to ultra-fine micron powder, and obtaining raw material powder for later use;
2) firing the raw material powder to a molten state, and obtaining a mixed molten salt material; and
3) adding magnesium oxide, adhesive and water to the mixed molten salt material, wherein the mixture contains: 55% mixed molten salt, 36% magnesium oxide, 8.5% adhesive and 0.5% water respectively, uniformly mixing, firing for 1-1.5 h at 730-750° C., preferably, firing for 1 h at 750° C., and obtaining the high-temperature phase change material.

DETAILED DESCRIPTION

The technical solution in embodiments of the present invention will be clearly and fully described below. The described embodiments are merely part of the embodiments of the present invention, not all of the embodiments. Based on the embodiments in the present invention, all other embodiments obtained by those ordinary skilled in the art without contributing creative labor will belong to the protection scope of the present invention.

In the following embodiments, the high-temperature phase change material is prepared by the following steps:
1) uniformly mixing the raw materials of the high-temperature phase change material according to mass ratio drying for 24 h at 120° C., grinding to ultra-fine micron powder, and obtaining raw material powder for later use;
2) firing the raw material powder to a molten state and obtaining a mixed molten salt material; and
3) adding magnesium oxide, adhesive and water to the mixed molten salt material, wherein the mixture contains: 55% mixed molten salt, 36% magnesium oxide, 8.5% adhesive and 0.5% water respectively, uniformly mixing, firing for 1 h at 750° C., and obtaining the high-temperature phase change material.

The specific operation of the combustion test is as follows: paving solid spheres of the catalytic phase change dielectric sphere at the combustion port of the methanol combustion furnace with the paving thickness of 5-10 mm, preferably 6 mm, and observing and recording methanol combustion state.

Embodiment 1

A preparation method for the catalytic phase change dielectric sphere for methanol combustion, comprising the following steps:
1) weighing all raw materials according to the following mass: 8 g of binary-molten-salt high-temperature phase change material consisting of sodium carbonate and sodium chloride in the mass ratio of 1:1, 0.05 g of palladium, 81.6 g of a-$Al_2O_3$, 0.15 g of cerium dioxide, 0.15 g of nano titanium dioxide, 0.05 g of nano cerium oxide, and 10 g of sodium silicate;
2) uniformly mixing the palladium, the a-$Al_2O_3$, the cerium dioxide, the nano titanium dioxide and the nano cerium oxide, grinding the mixture to ultra-fine micron powder, adding to the binary-molten-salt high-temperature phase change material, dispersing for 30 min at the rotational speed of 3500 r/min to be uniform, and obtaining a premix material;
3) adding sodium silicate and water to the premix material, fully stirring, dispersing and mixing, granulating, wherein the granulating diameter is 16 mm, and the granulating pressure is 15 mpa, and obtaining an initial product of the dielectric sphere, wherein the adding amount of water is 0.5 g; and
4) firing the initial product of the dielectric sphere for 1 h at 750° C., molding, and obtaining a solid sphere of the catalytic phase change dielectric sphere for methanol combustion.

When a professional methanol combustion furnace is used to conduct combustion test, solid spheres of the catalytic phase change dielectric sphere are paved at the combustion port of the methanol combustion furnace with the paving thickness of 6 mm, the test results are as follows: (according to the heat (Kcal) required for increasing the indoor area of 20000 $m^2$ by 1° C. (indoor height is 3 m)

| Test Indexes | Test Results |
|---|---|
| Methanol conversion rate | 87.3% |
| Average temperature reached by combustion furnace | 788° C. |
| Methanol consumption (kg/h) | 1.8 |
| Operating cost of methanol (yuan/h) (the unit price of methanol is calculated at 3 yuan/kg) | 5.40 |
| Power consumption of methanol combustion furnace (kW/h) | 1.50 |
| Power consumption cost (yuan/h) (electricity price: 0.5 yuan/kWh) | 0.75 |
| Direct operating cost, (methanol + power) (yuan/h) | 6.15 |
| Year-on-year power fare used (yuan/h) | 13.50 |

Embodiment 2

A preparation method for the catalytic phase change dielectric sphere for methanol combustion, comprising the following steps:
1) weighing all raw materials according to the following mass: 8 g of binary-molten-salt high-temperature phase change material consisting of sodium carbonate and sodium chloride in the mass ratio of 1:1, 0.05 g of palladium, 81.6 g of a-$Al_2O_3$, 0.15 g of cerium dioxide, 0.15 g of nano titanium dioxide, 0.05 g of nano cerium oxide, and 10 g of sodium silicate;
2) dividing the a-$Al_2O_3$ into two parts, wherein the mass ratio of the first part of a-$Al_2O_3$ to the second part of a-$Al_2O_3$ is 0.5, preparing the first part of a-$Al_2O_3$ into a hollow sphere, adhering the binary-molten-salt high-temperature phase change material to the surface of the hollow sphere by sodium silicate, the thickness being 20 um, and drying for 30 min at 80° C.;
3) mixing and reacting with the palladium, the second part a-$Al_2O_3$, the cerium dioxide, the nano titanium dioxide and the nano cerium oxide for 15 min, and obtaining a double-shell structure; and
4) firing the double-shell structure for 1 h at 750° C., and obtaining a hollow microporous sphere of the catalytic phase change dielectric sphere for methanol combustion.

When a professional methanol combustion furnace is used to conduct combustion test, solid spheres of the catalytic phase change dielectric sphere are paved at the combustion port of the methanol combustion furnace with the paving thickness of 5 mm, the test results are as follows: (according to the heat (Kcal) required for increasing the indoor area of 20000 m² by 1° C. (indoor height is 3 m)

| Test Indexes | Test Results |
|---|---|
| Methanol conversion rate | 99.3% |
| Average temperature reached by combustion furnace | 1001° C. |
| Methanol consumption (kg/h) | 1.6 |
| Operating cost of methanol (yuan/h) (the unit price of methanol is calculated at 3 yuan/kg) | 4.80 |
| Power consumption of methanol combustion furnace (kW/h) | 1.20 |
| Power consumption cost (yuan/h) (electricity price 0.5 yuan/kWh) | 0.60 |
| Direct operating cost, (methanol + power) (yuan/h) | 5.40 |
| Year-on-year power fare used (yuan/h) | 13.50 |

Embodiment 3

A preparation method for the catalytic phase change dielectric sphere for methanol combustion, comprising the following steps:
1) weighing all raw materials according to the following mass: 9.6 g of high-temperature phase change material obtained by mixing sodium carbonate, potassium carbonate, lithium carbonate and magnesium oxide in the mass ratio of 1:1:1:0.65, 0.05 g of rhodium, 80.06 g of a-$Al_2O_3$, 0.15 g of copper oxide, 0.15 g of mixture of nano stannic oxide and nano cadmium oxide in the mass ratio of 2:1, 0.05 g of nano tungsten oxide, and 10 g of silicone resin;
2) uniformly mixing the rhodium, the a-$Al_2O_3$, the copper oxide, and the mixture of nano stannic oxide and nano cadmium oxide in the mass ratio of 2:1 with the nano tungsten oxide, grinding the mixture to ultra-fine, micron power, adding to the high-temperature phase change material, dispersing for 30 min at the rotational speed of 5000 r/min to be uniform, and obtaining a premix material;
3) adding silicone resin and water to the premix material, fully stirring, dispersing and mixing, granulating, wherein the granulating diameter is 6 mm, and the granulating pressure is 15 mpa, and obtaining an initial product of the dielectric sphere, wherein the adding amount of water is 0.8 g; and
4) firing the initial product of the dielectric sphere for 1 h at 750° C., molding, and obtaining a solid sphere of the catalytic phase change dielectric sphere for methanol combustion.

When a professional methanol combustion furnace is used to conduct combustion test, solid spheres of the catalytic phase change dielectric sphere are paved at the combustion port of the methanol combustion furnace with the paving thickness of 10 mm, the test results are as follows: (according to the heat (Kcal) required for increasing the indoor area of 20000 m² by 1° C. (indoor height is 3 m)

| Test Indexes | Test Results |
|---|---|
| Methanol conversion rate | 88% |
| Average temperature reached by combustion furnace | 971° C. |
| Methanol consumption (kg/h) | 1.70 |
| Operating cost of methanol (yuan/h) (the unit price of methanol is calculated at 3 yuan/kg) | 5.10 |
| Power consumption of methanol combustion furnace (kW/h) | 1.20 |
| Power consumption cost (yuan/h) (electricity price: 0.5 yuan/kWh) | 0.6 |
| Direct operating cost, (methanol + power) (yuan/h) | 5.70 |
| Year-on-year power fare used (yuan/h) | 13.50 |

Embodiment 4

A preparation method for the catalytic phase change dielectric sphere for methanol combustion, comprising the following steps:
1) weighing all raw materials according to the following mass: 9.6 g of high-temperature phase change material obtained by mixing sodium carbonate, potassium carbonate, lithium carbonate and magnesium oxide in the mass ratio of 1:1:1:0.65, 0.05 g of rhodium, 80.0 g of a-$Al_2O_3$, 0.15 g of copper oxide, 0.15 g of mixture of nano stannic oxide and nano cadmium oxide in the mass ratio of 2:1, 0.05 g of nano tungsten oxide, and 10 g of silicone resin;
2) dividing the a-$Al_2O_3$ into two parts, wherein the mass ratio of the first part of a-$Al_2O_3$ to the second part of a-$Al_2O_3$ is 1:1, preparing the first part of a-$Al_2O_3$ into a hollow sphere, adhering the high-temperature phase change material to the surface of the hollow sphere by silicone resin, the thickness being 20 um, and drying for 30 min at 80° C.;
3) mixing and reacting with the rhodium, the second part a-$Al_2O_3$, the copper oxide, the mixture of nano stannic oxide and nano cadmium oxide in the mass ratio of 2:1 and nano tungsten oxide for 30 min, and obtaining a double-shell structure; and
4) firing the double-shell structure for 1 h at 750° C., and obtaining a hollow microporous sphere of the catalytic phase change dielectric sphere for methanol combustion.

When a professional methanol combustion furnace is used to conduct combustion test, solid spheres of the catalytic phase change dielectric sphere are paved at the combustion port of the methanol combustion furnace with the paving thickness of 7 mm, the test results are as follows: (according to the heat (Kcal) required for increasing the indoor area of 20000 m² by 1° C. (indoor height is 3 m)

| Test Indexes | Test Results |
|---|---|
| Methanol conversion rate | 99.5% |
| Average temperature reached by combustion furnace | 1012° C. |
| Methanol consumption (kg/h) | 1.6 |
| Operating cost of methanol (yuan/h) (the unit price of methanol is calculated at 3 yuan/kg) | 4.80 |
| Power consumption of methanol combustion furnace (kW/h)/h) | 0.60 |
| Power consumption cost (yuan/h) (electricity price: 0.5 yuan/kWh) | 0.30 |
| Direct operating cost, (methanol + power) (yuan/h) | 5.10 |
| Year-on-year power fare used (yuan/h) | 13.50 |

Embodiment 5

A preparation method for the catalytic phase change dielectric sphere for methanol combustion, comprising the following steps:
1) weighing all raw materials according to the following mass: 8.3 g of binary-molten-salt high-temperature phase change material consisting of sodium carbonate and potassium carbonate in the mass ratio of 1:1, 0.05 g of iridium, 81.3 g of a-Al2O3, 0.15 g of mixture of magnesium oxide and cerium dioxide in the mass ratio of 1:1, 0.15 g of nano ferric oxide, 0.05 g of nano tungsten oxide and 10 g of potassium silicate;
2) uniformly mixing the iridium, the a-$Al_2O_3$, the mixture of magnesium oxide and cerium dioxide in the mass ratio of 1:1, the nano ferric oxide and the nano tungsten oxide, grinding the mixture to ultra-fine micron powder, adding to the binary-molten-salt high-temperature phase change material, dispersing for 30 min at the rotational speed of 4000 r/min to be uniform, and obtaining a premix material;
3) adding potassium silicate and water to the premix material, fully stirring, dispersing and mixing, granulating, wherein the granulating diameter is 6 mm, and the granulating pressure is 15 mpa, and obtaining an initial product of the dielectric sphere, wherein the adding amount of water is 0.8 g; and
4) firing the initial product of the dielectric sphere for 1 h at 750° C., molding, and obtaining a solid sphere of the catalytic phase change dielectric sphere for methanol combustion.

When a professional methanol combustion furnace is used to conduct combustion test, solid spheres of the catalytic phase change dielectric sphere are paved at the combustion port of the methanol combustion furnace with the paving thickness of 8 mm, the test results are as follows: (according to the heat (Kcal) required for increasing the indoor area of 20000 m² by 1° C. (indoor height is 3 m)

| Test Indexes | Test Results |
| --- | --- |
| Methanol conversion rate | 89.9% |
| Average temperature reached by combustion furnace | 987° C. |
| Methanol consumption (kg/h) | 1.50 |
| Operating cost of methanol (yuan/h) (the unit price of methanol is calculated at 3 yuan/kg) | 4.50 |
| Power consumption of methanol combustion furnace (kW/h) | 1.10 |
| Power consumption cost (yuan/h) (electricity price: 0.5 yuan/kWh) | 0.55 |
| Direct operating cost, (methanol + power) (yuan/h) | 5.05 |
| Year-on-year power fare used (yuan/h) | 13.50 |

Embodiment 6

A preparation method for the catalytic phase change dielectric sphere for methanol combustion, comprising the following steps:
1) weighing all raw materials according to the following mass: 8.3 g of binary-molten-salt high-temperature phase change material consisting of sodium carbonate and potassium carbonate in the mass ratio of 1:1, 0.05 g of iridium, 81.3 g of a-$Al_2O_3$, 0.15 g of mixture of magnesium oxide and cerium dioxide in the mass ratio of 1:1, 0.15 g of nano ferric oxide, 0.05 g of nano tungsten oxide and 10 g of potassium silicate;
2) dividing the a-$Al_2O_3$ into two parts, wherein the mass ratio of the first part of a-$Al_2O_3$ to the second part of a-$Al_2O_3$ is 0.8:1, preparing the first part of a-$Al_2O_3$ into a hollow sphere, adhering the binary-molten-salt high-temperature phase change material to the surface of the hollow sphere by potassium silicate, the thickness being 20 um, and drying for 30 min at 80° C.;
3) mixing and reacting with the iridium, the second part a-$Al_2O_3$, the mixture of magnesium oxide and cerium dioxide in the mass ratio of 1:1, the nano ferric oxide and the nano tungsten oxide for 25 min, and obtaining a double-shell structure; and
4) firing the double-shell structure for 1 h at 750° C., and obtaining a hollow microporous sphere of the catalytic phase change dielectric sphere for methanol combustion.

When a professional methanol combustion furnace is used to conduct combustion test, solid spheres of the catalytic phase change dielectric sphere are paved at the combustion port of the methanol combustion furnace with the paving thickness of 6 mm, the test results are as follows: (according to the heat (Kcal) required for increasing the indoor area of 20000 m² by 1° C. (indoor height is 3 m)

| Test Indexes | Test Results |
| --- | --- |
| Methanol conversion rate | 99.9% |
| Average temperature reached by combustion furnace | 1048° C. |
| Methanol consumption (kg/h) | 1.40 |
| Operating cost of methanol (yuan/h) (the unit price of methanol is calculated at 3 yuan/kg) | 4.20 |
| Power consumption of methanol combustion furnace (kW/h) | 0.60 |
| Power consumption cost (yuan/h) (electricity price: 0.5 yuan/kWh) | 0.30 |
| Direct operating cost, (methanol + power) (yuan/h) | 4.50 |
| Year-on-year power fare used (yuan/h) | 13.50 |

The invention claimed is:

1. A catalytic phase change dielectric sphere for methanol combustion, prepared from the following part by weight of raw materials (measured by 100 parts by weight): 8-12 parts of high-temperature phase change material, 0.05-0.30 part of active material, 75.2-81.7 parts of carrier material, 0.10-0.20 part of catalyst material, 0.10-0.20 part of nano-semiconductor material, 0.05-0.10 part of nano-transition metal and 10-12 parts of adhesive.

2. The catalytic phase change dielectric sphere for methanol combustion according to claim 1, wherein the high-temperature phase change material is a binary-molten-salt high-temperature phase, change material consisting of sodium carbonate and sodium chloride, a binary-molten-salt high-temperature phase change material consisting of sodium carbonate and potassium carbonate, a ternary-molten-salt high-temperature phase change material consisting of sodium carbonate, potassium chloride and sodium chloride or a high-temperature phase change material consisting of sodium carbonate, potassium carbonate, lithium carbonate and magnesium oxide.

3. The catalytic phase change dielectric sphere for methanol combustion according to claim 2, wherein the mass ratio of sodium carbonate to sodium chloride in the binarymolten-salt high-temperature phase change material consisting of sodium carbonate and sodium chloride is 0.5-1:0.75-1;

the mass ratio of sodium carbonate to potassium carbonate in the binary-molten-salt high-temperature phase change material consisting of sodium carbonate and potassium carbonate is 0.5-1:0.75-1;

the mass ratio of sodium carbonate to potassium chloride and sodium chloride in the ternary-molten-salt high-temperature phase change material consisting of sodium carbonate, potassium chloride and sodium chloride is 0.5-1:0.75-1:0.75-1; and the mass ratio of sodium carbonate to potassium carbonate, lithium carbonate and magnesium oxide in the high-temperature phase change material consisting of sodium carbonate, potassium carbonate, lithium carbonate and magnesium oxide is 0.5-1:0.5-1:1:0.3-0.65.

4. A preparation method for the catalytic phase change dielectric sphere for methanol combustion, comprising preparing a solution 1 and a solution 2, wherein the preparation of solution 1 comprises the following steps:

1) weighing each raw material according to the part by weight of the raw materials of the catalytic phase change dielectric sphere for methanol combustion according to claim 3;
2) uniformly mixing the active material, the carrier material, the catalyst material, the nano-semiconductor material and the nano-transition metal, grinding the mixture to be ultra-fine micron powder, adding to the high-temperature phase change material, uniformly dispersing, and obtaining a premix material;
3) adding adhesive and an appropriate amount of water to the premix material, stirring, dispersing and mixing, granulating, and obtaining an initial product of the dielectric sphere; and
4) firing the initial product of the dielectric sphere, molding, and obtaining a solid sphere of the catalytic phase change dielectric sphere for methanol combustion;

and the preparation of solution 2 comprises the following steps:

1) weighing each raw material according to the part by weight of the raw materials of the catalytic phase change dielectric sphere for methanol combustion according to claim 3;
2) dividing the carrier material into two parts, preparing the first part of carrier material into a hollow sphere, adhering the high-temperature phase change material to the surface of the hollow sphere by the adhesive, drying;
3) mixing and reacting with the active material, the second part of carrier material, the catalyst material, the nano-semiconductor material and the nano-transition metal, obtaining a double-shell structure; and
4) firing the double-shell structure, and obtaining a hollow microporous sphere of the catalytic phase change dielectric sphere for methanol combustion.

5. A preparation method for the catalytic phase change dielectric sphere for methanol combustion according to claim 4, wherein the high-temperature phase change material in the solution 1 or solution 2 is prepared by the following steps:

1) uniformly mixing the raw materials of the high-temperature phase change material according to the mass ratio, drying and then grinding the mixture to be ultra-fine micron powder, and obtaining raw material powder for later use;
2) firing the raw material powder to a molten state, obtaining a mixed molten salt material; and
3) adding magnesium oxide, adhesive and water to, the mixed molten salt material, uniformly mixing and then firing, and obtaining the high-temperature phase change material.

6. A preparation method for the catalytic phase change dielectric sphere for methanol combustion according to claim 5, wherein in the step 3), the mass percentages of the mixed molten salt material, the magnesium oxide, the adhesive and the water are 55%, 36%, 8.5% and 0.5% respectively.

7. The catalytic phase change dielectric sphere for methanol combustion according to claim 1, wherein the active material is one or a combination of platinum, palladium, rhodium or iridium;

the carrier material is one or a combination of $\alpha$-Al2O3, kyanite, spinel, silicon carbide, silicon nitride, silicon phosphide, boron carbide, boron nitride, boron phosphide, mullite;

the catalyst material is one or a combination of magnesium oxide, cerium dioxide, copper oxide, manganese oxide;

the nano-semiconductor material is one or a combination of nano titanium dioxide, nano zinc oxide, nano tin oxide, nano cadmium oxide, nano ferric oxide, nano aluminium oxide, nano chromium oxide and nano aluminium trioxide;

the nano-transition metal is one or a combination of nano cerium oxide, nano cobaltous oxide and nano tungsten oxide; and the adhesive is one or a combination of silica sol, potassium silicate, sodium silicate, silicone resin, phenolic resin, urea-formaldehyde resin, high-temperature-resistant epoxy resin and polyimide resin.

8. A preparation method for the catalytic phase change dielectric sphere for methanol combustion according to claim 5, wherein in the step 1), the drying temperature is 115-125° C., the duration is 24-30 h; and in the step 3), the firing operation is performed for 1-1.5 h at 730-750° C.

9. A preparation method for the catalytic phase change dielectric sphere for methanol combustion according to claim 4, wherein in the step 2) of the solution 1, the dispersing duration is 30-35 min, the rotational speed is 3500-5000 r/min;

in the step 3), the granulating diameter is 6-19 mm, the granulating pressure is 13-17 mpa; and the adding amount of water accounts for 0.5%-0.8% of the gross weight of the raw materials of the catalytic phase change dielectric sphere for methanol combustion; and in the step 4), the firing operation is performed for 1-1.5 h at 730-750° C.

10. A preparation method for the catalytic phase change dielectric sphere for methanol combustion according to claim 4, wherein in the solution 2, the mass ratio of the first part of carrier material to the second part of carrier material is 0.5-1:1;

in the step 2), an adhering thickness of the high-temperature phase change material is 18-20 μm; and the drying operation is performed for 30-32 min at 80-85° C.;

in the step 3), the mixing and reacting duration is 15-30 min; and in the step 4), the firing operation is performed for 1-1.5 h at 730-750° C.

* * * * *